(12) United States Patent
Nagasawa et al.

(10) Patent No.: US 9,984,723 B2
(45) Date of Patent: May 29, 2018

(54) MAGNETIC RECORDING AND REPRODUCING APPARATUS AND MAGNETIC RECORDING AND REPRODUCING METHOD

(71) Applicant: Kabushiki Kaisha Toshiba, Tokyo (JP)

(72) Inventors: Tazumi Nagasawa, Kanagawa (JP);
Taro Kanao, Kanagawa (JP);
Michinaga Yamagishi, Kanagawa (JP);
Hirofumi Suto, Kanagawa (JP);
Kiwamu Kudo, Kanagawa (JP); Rie Sato, Kanagawa (JP); Koichi Mizushima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/444,646

(22) Filed: Feb. 28, 2017

(65) Prior Publication Data
US 2017/0294207 A1 Oct. 12, 2017

(30) Foreign Application Priority Data
Apr. 6, 2016 (JP) ................ P2016-076687

(51) Int. Cl.
*G11B 5/09* (2006.01)
*G11B 20/10* (2006.01)
*G11B 5/39* (2006.01)

(52) U.S. Cl.
CPC ...... *G11B 20/10481* (2013.01); *G11B 5/3909* (2013.01)

(58) Field of Classification Search
None
See application file for complete search history.

(56) References Cited

U.S. PATENT DOCUMENTS 6,031,800 A * 2/2000 Narumi ................ G11B 7/0045
369/47.3
6,111,833 A * 8/2000 Nakagawa ....... G11B 20/10009
369/124.1
(Continued)

FOREIGN PATENT DOCUMENTS

EP 2 833 546 2/2015
JP 4098786 6/2008
(Continued)

OTHER PUBLICATIONS

Mizushima, K. et al. (2010). "Signal-to-noise ratios in high-signal-transfer-rate read heads composed of spin-torque oscillators," *Journal of Applied Physics*, vol. 107; pp. 063904-1-063904-7.

(Continued)

*Primary Examiner* — Peter Vincent Agustin
(74) *Attorney, Agent, or Firm* — Finnegan, Henderson, Farabow, Garrett & Dunner, L.L.P.

(57) ABSTRACT

A magnetic recording and reproducing apparatus for recording and reproducing bit information comprising a magnetic head having a spin torque oscillator configured to readout bit information which is recorded on a magnetic recording medium, a detector configured to detect amplitude of a first signal, the first signal which is to reproduce the bit information, and a controller configured to control the magnetic head so as to read the bit information recorded on the magnetic recording medium when the amplitude of the first signal detected by the detector is smaller than a predetermined value.

17 Claims, 9 Drawing Sheets

(56) References Cited

U.S. PATENT DOCUMENTS

| | | |
|---|---|---|
| 7,602,588 B2 | 10/2009 | Sato et al. |
| 7,826,160 B2 | 11/2010 | Sato et al. |
| 7,940,485 B2 | 5/2011 | Kudo et al. |
| 8,810,954 B1* | 8/2014 | Taguchi ............ G11B 20/10018 360/125.3 |
| 8,896,973 B2 | 11/2014 | Nagasawa et al. |
| 2009/0278240 A1* | 11/2009 | Kaneko ............... H01L 23/5227 257/659 |
| 2010/0053795 A1* | 3/2010 | Kudo ..................... B82Y 25/00 360/73.03 |
| 2011/0141629 A1* | 6/2011 | Braganca ............... B82Y 25/00 360/313 |
| 2012/0250398 A1* | 10/2012 | Morise ............... G11C 19/0841 365/157 |
| 2013/0094284 A1* | 4/2013 | Ohno ..................... H01L 43/08 365/158 |
| 2013/0215530 A1* | 8/2013 | Igarashi ............... G11B 5/1278 360/59 |
| 2014/0160598 A1* | 6/2014 | Takashita ............... G11B 5/147 360/234.3 |
| 2014/0168808 A1* | 6/2014 | Koizumi .................. G11B 5/40 360/31 |
| 2016/0064016 A1* | 3/2016 | Koizumi .................. G11B 7/00 360/39 |

FOREIGN PATENT DOCUMENTS

| | | |
|---|---|---|
| JP | 2010-55725 | 3/2010 |
| JP | 4966147 | 7/2012 |
| JP | 2013-97828 | 5/2013 |
| JP | 2015-511806 | 4/2015 |

OTHER PUBLICATIONS

Slavin, A. et al. (Apr. 2009). "Nonlinear Auto-Oscillator Theory of Microwave Generation by Spin-Polarized Current," *IEEE Transactions on Magnets*, vol. 45, No. 4; pp. 1875-1918.

* cited by examiner

MAGNETIC RECORDING AND REPRODUCING APPARATUS AND MAGNETIC RECORDING AND REPRODUCING METHOD

CROSS-REFERENCE TO RELATED APPLICATIONS

This application is based upon and claims the benefit of priority from Japanese Patent Application NO. 2016-076687 filed on Apr. 6, 2016, the entire contents of which are incorporated herein by reference.

FIELD

Embodiments describe herein generally relate to a magnetic recording and reproducing apparatus and a method for controlling a magnetic recording and reproducing apparatus.

BACKGROUND

With utilizing a magnetic head using a magnetoresistive element, a magnetic recording apparatus has improved its recording density at remarkable speed.

However, as for the magnetic head using the magnetoresistive element there is still a problem that should cope with shot noise and white noise because those noises cause reducing an S/N (signal noise) ratio.

In order to solve this problem, applying a spin torque oscillator as a magnetic sensor has been proposed to realize a high S/N ratio.

DESCRIPTION OF EMBODIMENTS

According to one embodiment, a magnetic recording and reproducing apparatus for recording and reproducing bit information comprising a magnetic head having a spin torque oscillator configured to read out bit information which is recorded on a magnetic recording medium, a detector configured to detect an amplitude of a first signal, the first signal which is to reproduce the bit information, and a controller configured to control the magnetic head so as to read the bit information recorded on the magnetic recording medium when the amplitude of the first signal detected by the detector is smaller than a predetermined value, is provided.

Hereinafter, embodiments of the present invention will be described with reference to the drawings. The same parts will be denoted by the same reference signs. Incidentally, the drawings are schematic or conceptual, and a relationship between a thickness and a width of each portion, and a coefficient of a size ratio between portions, and the like are not necessarily the same as those in reality. In addition, the same portion may be shown with different dimensions or ratios depending on the figures.

In a magnetic recording and reproducing apparatus which uses a spin torque oscillator as a magnetic sensor, it is possible to reduce phase fluctuations of a signal when delay detection is performed in a delay time shorter than a reciprocal of a relaxation rate $\Gamma_p$ to a steady-state value of oscillation power of the spin torque oscillator, and thus, it is possible to realize a high S/N ratio. In addition, such high S/N ratio is expected when the relaxation rate $\Gamma_p$ of the oscillation power is small.

However, the inventors have found that the fluctuation of the oscillation power by the spin torque oscillator becomes greater and the oscillation power instantaneously decreases when the relaxation rate $\Gamma_p$ of the oscillation power is small. Thus, BER (bit error rate) at the time of reproducing a signal of the spin torque oscillator becomes to increase due to the decrease of the oscillation power.

Thus, it is necessary to control the reproduction of the signal of the spin torque oscillator on consideration of the decrease of the oscillation power.

Figure 1:
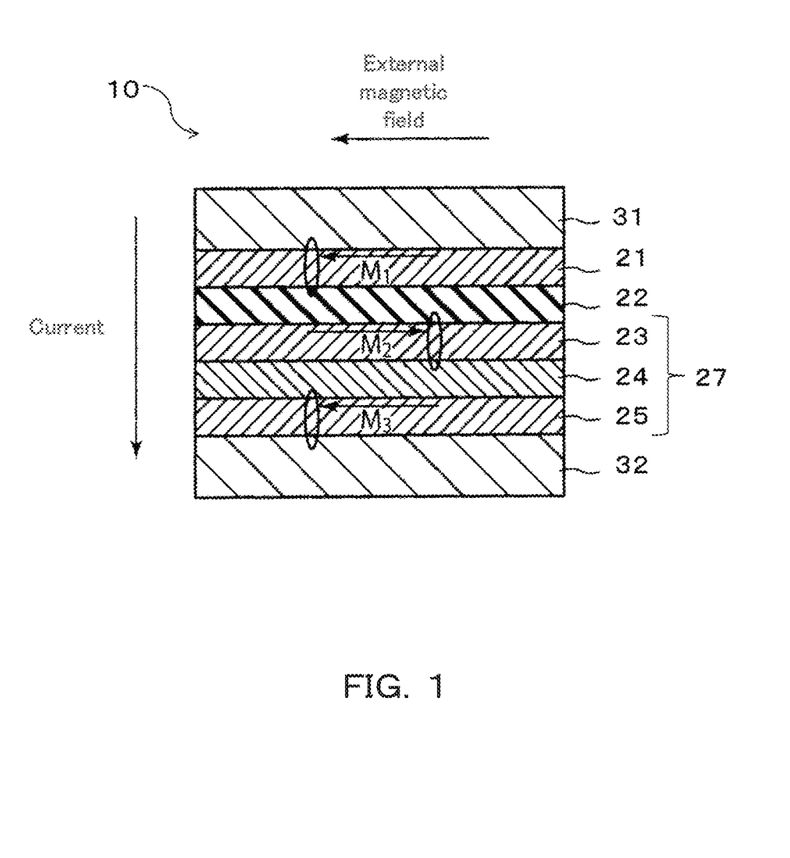
FIG. 1 is a diagram illustrating an example of a spin torque oscillator applied to an embodiment.

FIG. 1 illustrates one example of a spin torque oscillator 10 applied to an embodiment. The spin torque oscillator 10 is provided, for example in a magnetic head of a magnetic recording and reproducing apparatus and is used as a magnetic sensor.

As illustrated in FIG. 1, the spin torque oscillator 10 has a stacked film which includes a first ferromagnetic layer 21, a second ferromagnetic layer 23, a third ferromagnetic layer 25 provided on the opposite side of the first ferromagnetic layer 21 with respect to the second ferromagnetic layer 23, a first non-magnetic layer 22 provided between the first ferromagnetic layer 21 and the second ferromagnetic layer 23, and a second non-magnetic layer 24 provided between the second ferromagnetic layer 23 and the third ferromagnetic layer 25.

The spin torque oscillator 10 further has a pair of electrodes 31 and 32 which is provided with the stacked film sandwiched therebetween and causes a current flow vertically to a film surface of the stacked film. Herein, the film surface is vertical to a stacking direction of the stacked film.

The second ferromagnetic layer 23 and the third ferromagnetic layer 25 are configured to form antiferromagnetic coupling via the second non-magnetic layer 24. That is, the second ferromagnetic layer 23, the second non-magnetic layer 24, and the third ferromagnetic layer 25 form an antiferromagnetic coupling film 27.

Incidentally, each direction of magnetization of the first to third ferromagnetic layers 21, 23 and 25 is substantially parallel to the film surface.

In addition, in FIG. 1, the stacked film is configured, so that the first ferromagnetic layer 21 is arranged at the top and the third ferromagnetic layer 25, the second non-magnetic layer 24, the second ferromagnetic layer 23, the first non-magnetic layer 22, and the first ferromagnetic layer 21 are stacked in this order.

However, the stacking order of the stacked film may also be reversed upside down. That is, the stacked film may be configured so that the first ferromagnetic layer 21, the first non-magnetic layer 22, the second ferromagnetic layer 23, the second non-magnetic layer 24, and the third ferromagnetic layer 25 are stacked in this order.

As the current flows to the stacked film via the electrodes 31 and 32 of the spin torque oscillator 10, precession of magnetization is induced in each of all ferromagnetic layers, the first to third ferromagnetic layers 21, 23, and 25 due to a spin torque transfer effect.

Thus, rotating magnetic field having frequency (magnetic resonance frequencies) of the precession is output from the respective ferromagnetic layers 21, 23, and 25. Incidentally, the magnetic resonance frequency is changed depending on a size and a direction of external magnetic field to be applied to the ferromagnetic layer 21, 23, and 25.

Thus, the resistance is changed by mainly changing a relative angle of magnetization between the first ferromagnetic layer 21 and the second ferromagnetic layer 23. Accordingly, each of the first to third ferromagnetic layers 21, 23 and 25 forming the spin torque oscillator 10 becomes a free layer.

Because the spin torque oscillator 10 does not have an antiferromagnetic layer, a thickness of the oscillator 10 can be designed to be equal to or smaller than 13 nm, for example. The thickness here is except for a thickness of both electrodes.

The electrodes 31 and 32 are formed of conductive material. As conductive material, it is possible to use a material causing magnetic shield such as a soft magnetic material.

In this case, it is possible to shield magnetic information from a bit other than a bit which is desirably reproduced in bit information (i.e. bit data) recorded in a magnetic recording medium.

Each ferromagnetic layer 21, 23 and 25 is, for example, a ferromagnetic material containing Co, Ni, or Fe or an alloy containing these materials. In addition, each ferromagnetic layer 21, 23 and 25 may be configured using a stacked film including a plurality of ferromagnetic materials in order to finely adjust magnetic properties or increase the MR effect.

The non-magnetic layer 22 may be non-magnetic material such as Cu, Ag, or Cr or non-magnetic alloy containing these materials. Herein, Cu layer is used as the non-magnetic layer 22. In addition, the non-magnetic layer 22 may be an insulating film made of MgO, $Al_2O_3$ (an aluminum oxide film) or the like. In addition, current path of metal may be present in the insulating film.

The antiferromagnetic coupling film 27 may be formed as a synthetic antiferromagnetic film in which two magnetic moments of the ferromagnetic layers 23 and 25 are the same or may be formed as a synthetic ferromagnetic film in which any one magnetic moment of the layers 23 and 25 is larger than the other one. Herein, when magnetic field is applied to a direction of an easy axis through crystal anisotropy or shape anisotropy, according to this embodiment magnetization inversion will not occur in a wider magnetic field range compared to a case of using a monolayer film.

Then, when external magnetic field having a magnetization direction antiparallel to the magnetization direction of the second ferromagnetic layer 23 is applied to the spin torque oscillator 10, the magnetization direction of the first ferromagnetic layer 21 can be directed to the direction of the external magnetic field.

Further, the magnetization directions of the first ferromagnetic layer 21 and the second ferromagnetic layer 23 can be directed to directions that are substantially antiparallel to each other (antiparallel arrangement) in the wide magnetic field range.

Figure 2:
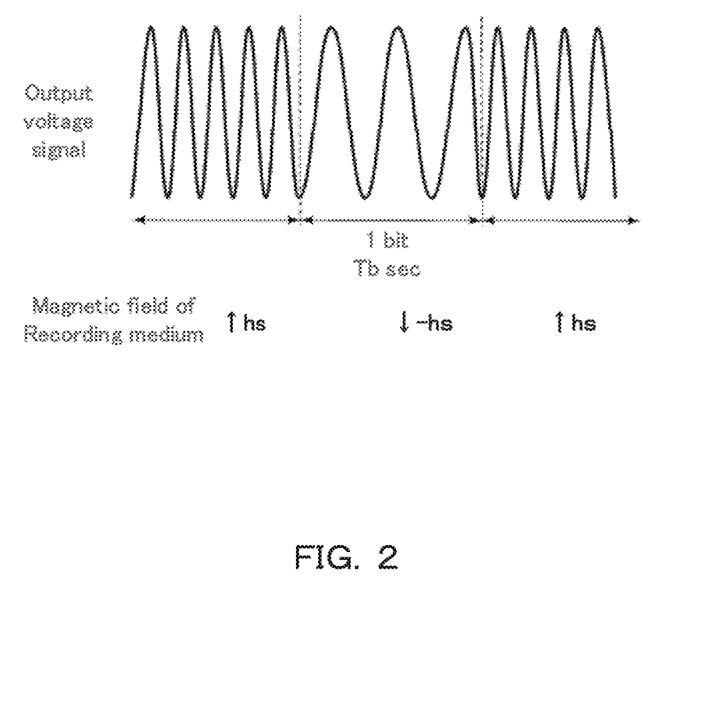
FIG. 2 is a diagram illustrating a signal output by the spin torque oscillator.

FIG. 2 schematically illustrates a relationship of magnetic field (hs) of the magnetic recording medium and signal (i.e. output voltage signal) of the spin torque oscillator 10.

Depending on directions of the magnetic field (hs), oscillation frequency of the signal by the oscillator 10 is to be changed. Time $T_b$ per one bit corresponds to about 0.5 ns (2 Gb/s). The time $T_b$ per one bit is sufficiently short, compared to phase correlation time (several hundred ns) of the spin torque oscillator 10.

Thus, it is possible to compare a phase of a signal before one bit with a phase of a current signal. Accordingly a phase difference between the signal before one bit and the current signal can be detected, so it is possible to reproduce a signal recorded on the magnetic recording medium.

If the spin torque oscillator is applied to the magnetic head, high-speed signal detection can be achieved by utilizing the change of the oscillation frequency instead of change of transmission amplitude caused by the magnetic field of the magnetic recording medium.

This is because the change of the oscillation amplitude requires a magnetic relaxation time for magnetization of the free layer, but the change of the oscillation frequency is the time which is shorter than the magnetic relaxation time by several orders.

Figure 3:
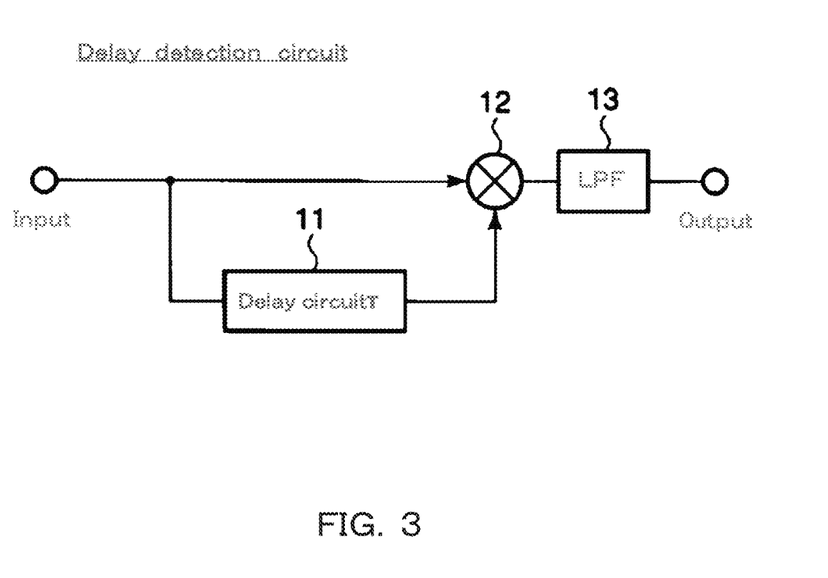
FIG. 3 is a diagram illustrating a delay detection circuit applied to the embodiment.

FIG. 3 illustrates a delay detection circuit applied to the embodiment.

A delay detection circuit includes a delay circuit 11, a multiplier 12, and a low pass filter (LPF) 13.

A signal of the spin torque oscillator input to the delay detection circuit 3 is divided into two signals. One signal is converted into a signal (third signal) delayed by a time τ while passing through the delay circuit 11. The signal (third signal) delayed by the time τ is input to the multiplier (synthesized signal output unit) 12.

The other signal (first signal) is directly input to the multiplier 12. The first signal and the third signal input to the multiplier 12 are multiplied (synthesized) by the multiplier 12. The multiplied signal (synthesized signal) is input to the low pass filter (filter processing unit) 13.

The low pass filter 13 receives the multiplied signal and performs filter processing. To be specific, a higher frequency component of a certain frequency by the multiplied signal is diminished. The low pass filter 13 outputs the signal as a reproduction signal after the filter processing.

The spin torque oscillator 10 is an oscillation element (non-linear oscillation element) in which an amplitude of oscillation and a phase are coupled, and thus, has a property that the amplitude fluctuations (power fluctuations) increases the phase fluctuations. When delay detection is performed with a delay time $T_b$, which is shorter than a reciprocal (1/Γp) of the oscillation power relaxation rate $\Gamma_p$ of the spin torque oscillator 10, it is possible to reduce the phase fluctuations. Thus, the high S/N ratio can be realized.

Figure 4:
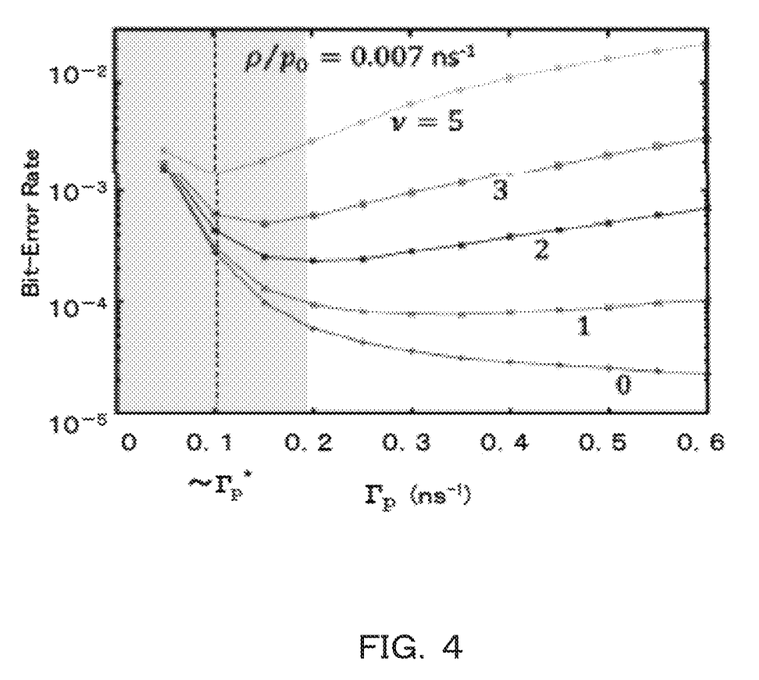
FIG. 4 is a relationship diagram between a BER and $\Gamma_p$ of the spin torque oscillator.

FIG. 4 illustrates a relationship between oscillation power relaxation rate $\Gamma_p$ and bit error rate (BER) of the spin torque oscillator 10.

FIG. 4 illustrates relationship between oscillation power relaxation rate and BER in cases that amplitude phase coupling coefficient ν is 0, 1, 2, 3, or 5. The amplitude phase coupling coefficient ν is a dimensionless quantity that indicates the intensity of coupling between the amplitude and the phase.

In a case that the spin torque oscillator is non-linear (ν≠0), by performing the delay detection with delay time τ which is shorter than the reciprocal (1/Γp) of the oscillation power relaxation rate, the phase fluctuations caused by the amplitude phase coupling is reduced and the high S/N ratio can be realized. Herein if the delay time T is set to be constant, a higher S/N ratio can be expected as the oscillation power relaxation rate $\Gamma_p$ becomes smaller.

Meanwhile, the BER increases as the oscillation power relaxation rate $\Gamma_p$ becomes smaller than a certain value. For example, when the amplitude phase coupling coefficient ν=3, the BER increases as the oscillation power relaxation rate $\Gamma_p$ becomes smaller than 0.15 ns$^{-1}$.

The relationship between the oscillation power relaxation rate $\Gamma_p$ and the BER was calculated by a simulation.

A non-linear oscillator model which is capable of describing oscillation properties of a spin torque oscillator was used. The bit error rate (BER) was obtained by using a simulation by incorporating a random pulsed magnetic field sequence (bit sequence) effect caused by magnetization of a magnetic recording medium and reproducing a bit sequence through delay detection.

A magnetic signal at time t of the spin torque oscillator having an oscillation frequency co is set to s(t)=cos ωt. The magnetic signal s(t) is a signal obtained by removing DC component and harmonic component. When Fourier component with a negative frequency is removed from s(t), a signal of a complex number c(t)=e$^{iωt}$ is obtained. Herein, power and phase at the time t are respectively defined as p(t)=|c(t)|$^2$ and φ(t)=arg·c(t). The oscillation properties of the spin torque oscillator can be described using the Stuart-Lamdau (SL) equation. When the SL equation is used as the non-linear oscillator model, the signal c(t) can be expressed as follows.

[Formula 1]

$$\frac{dc}{dt} = -i\omega(p)c - \Gamma(p)c + n \quad (1)$$

Herein, each of i and n has an imaginary unit indicating noise. The relaxation rate Γ(p) of the amplitude and the oscillation frequency ω(p) depend on the power as follows.

[Formula 2]

$$\Gamma(p) = \Gamma_p\left(\frac{p}{p_0} - 1\right) \quad (2)$$

[Formula 3]

$$\omega(p) = \omega_0 + \nu\Gamma_p\frac{p}{p_0} \quad (3)$$

Here, $p_0$ represents a steady-state value of the power, $\Gamma_p$ is a fluctuation relaxation rate from the steady-state value $p_0$ of the power. The dimensionless quantity indicating the intensity of the amplitude phase coupling is denoted by ν. A ferromagnetic resonance frequency is denoted by $\omega_0$, and this is a component that does not depend on the power in the oscillation frequency. White Gaussian noise is denoted by n, which satisfies the following formula.

[Formula 4]

$$\langle n(t)\rangle = 0,$$

$$\langle n(t)n(t')\rangle = 0,$$

$$\langle n^*(t)n(t')\rangle = 2\rho\delta(t-t') \quad (4)$$

Here, ρ is a parameter indicating the intensity of noise. Although it has been known that $\Gamma_p$ and $p_0$ correlatively increase due to an increase of a current value or the like in a single spin torque oscillator, the relationship between $\Gamma_p$ and $p_0$ is not necessarily a simple proportional relationship. In the simulation, $\Gamma_p$ and $p_0$ were handled as independent parameters. It was assumed that ρ does not depend on the power.

When Formula (1) is expressed by an equation with respect to p and φ,

[Formula 5]

$$\frac{dp}{dt} = -2\Gamma(p)p + 2\sqrt{p}\,x \quad (5)$$

and

[Formula 6]

$$\frac{d\phi}{dt} = -\omega(p) - \frac{1}{\sqrt{p}}y \quad (6)$$

are obtained. Here, x=Re(ne$^{-i\varphi}$), and y=−Im(ne$^{i\varphi}$) are used. The SL equation of Formula (5) and Formula (6) is a stochastic differential equation as a differential equation including the white Gaussian noise. The Heum's method is used as a numerical solution of the stochastic differential equation.

Evaluation of the bit error rate was performed as follows. The influence of a pulsed magnetic field sequence for reproduction was set to change as $\omega_0=\omega_c+\delta_\omega$ or $\omega_0=\omega_c-\delta_\omega$. The delay time τ (about 0.1 ns) was set so as to satisfy an orthogonality condition, and a change amount of a phase shift of the random magnetic field pulse sequence for the time τ was obtained. The orthogonality condition is $\omega_0$, =2 nπ−π/2 (n is integer). The time per bit was set to $T_b$=0.5 ns (a bit transfer rate of 2 Gb/s), the low pass filter processing with a frequency 1/$T_b$ was performed, and a result thereof and the random magnetic field pulse sequence were compared to obtain the bit error rate.

In FIG. 4, the following values were used for the relationship between the oscillation power relaxation rate $\Gamma_p$ and the bit error rate (BER).

fc=$\omega_c$/(2π)=3 GHz,

δf=δω/(2π)=0.1 GHz, $T_b$=0.5 ns(the bit transfer rate of 2 Gb/s), and

ρ/$p_0$=0.007 ns$^{-1}$.

Figure 5:
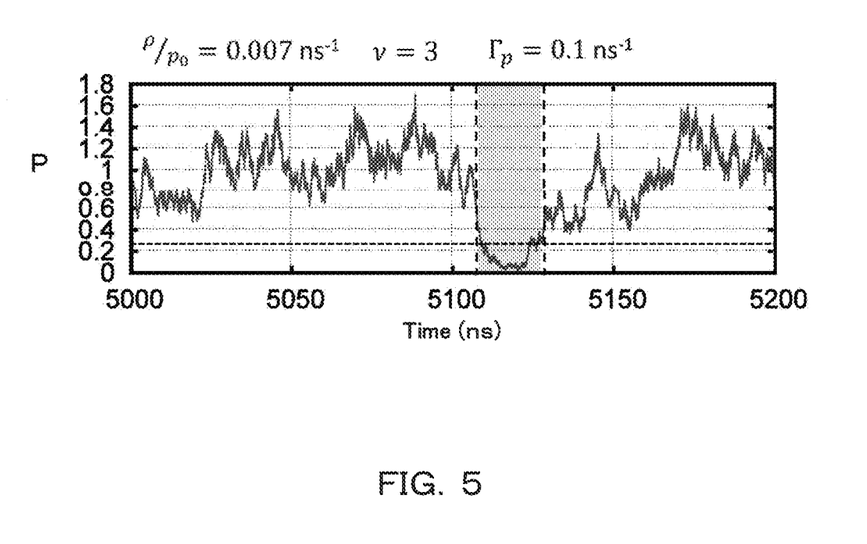
FIG. 5 is relationship diagrams between power of the spin torque oscillator and time according to the embodiment.

FIG. 5 illustrate relationship diagrams between the power of the spin torque oscillator and time according to the embodiment.

FIG. 5 illustrates a relationship between power P of the spin torque oscillator and time in case that the oscillation power relaxation rate $\Gamma_p$=0.1 ns$^{-1}$.

FIG. 5 was calculated by a simulation using ρ/$p_0$=0.007 ns$^{-1}$ and ν=3. When the oscillation power relaxation rate $\Gamma_p$=0.1 ns$^{-1}$, a time zone in which the power P of the spin torque oscillator decreases is generated as illustrated in a region surrounded by the dotted line. This is caused by thermal fluctuations. When the power P once decreases, time of about $1/\Gamma_p$ is required until returning to the power P in the steady state. The BER increases for this time.

In the time zone in which the power P of the spin torque oscillator decreases, the amplitude of the signal of the spin torque oscillator decreases.

Figure 6:
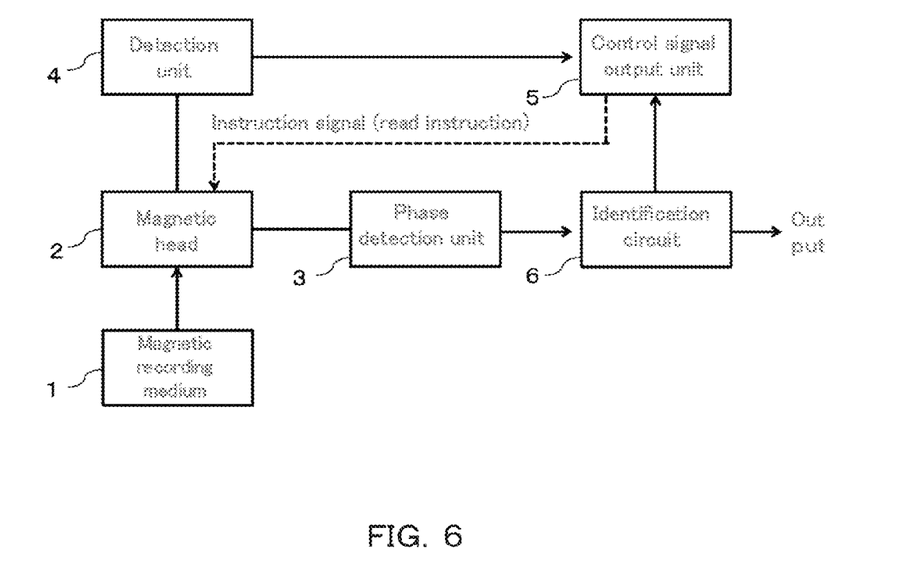
FIG. 6 is a diagram illustrating a configuration of a magnetic recording and reproducing apparatus according to the embodiment.

FIG. 6 illustrates a configuration of the magnetic recording and reproducing apparatus according to a third embodiment.

The magnetic recording and reproducing apparatus includes a magnetic recording medium 1, a magnetic head 2 including the spin torque oscillator, a phase detection unit 3, a detection unit 4, a control signal output unit 5, and an identification circuit 6.

Herein, it is possible to assume a case where the oscillation power relaxation rate Γp of the spin torque oscillator 10 used in the magnetic head 2 is smaller than $0.15\ \mathrm{ns}^{-1}$. This case is that the intensity of the amplitude phase coupling v=3, as illustrated in FIG. 5, for example.

As another example, it is also possible to assume a case where the oscillation power relaxation rate $\Gamma_p$ of the spin torque oscillator used in the magnetic head 2 is smaller than $0.1\ \mathrm{ns}^{-1}$. According to this case, even in a situation that the BER becomes greater, reproducing output signal can be obtained accurately.

The magnetic head 2 using the spin torque oscillator reads information recorded in the magnetic recording medium 1 and outputs a first signal. The first signal is a signal configured to reproduce bit information recorded in the magnetic recording medium 1. The output first signal is input to the detection unit 4 and the phase detection unit 3.

The detection unit 4 compares amplitude of the first signal and a predetermined value. The predetermined value is, for example, a value which is a quarter of an average value of the power P of the spin torque oscillator. The detection unit 4 detects whether the amplitude of the first signal is smaller than the predetermined value. When the first signal is smaller than the predetermined value, the detection unit 4 outputs a second signal. For example, a semiconductor diode or a spin torque diode is used as a detector such that the detection unit 4 detects the output (power) of the first signal.

The control signal output unit 5 receives the second signal output by the detection unit 4. When receiving the second signal, in response to the second signal the control signal output unit 5 outputs a control signal that controls the magnetic head 2, to the magnetic head 2. For example, when the first signal is smaller than the predetermined value, the control signal output unit 5 outputs an instruction signal (the instruction signal including a read instruction) to the magnetic head 2 such that the magnetic head 2 reads the information again recorded in the magnetic recording medium 1 again.

On the other hand, the first signal is the same as or larger than the predetermined value, the detection unit 4 does not output the second signal and reading bit information by the magnetic head 2 has been continued.

The above described control signal that controls the magnetic head 2 and the instruction signal instructing the magnetic head 2 to read the bit information recorded in the magnetic recording medium 1 again may be output from the same output unit or may also be output from different output units.

As illustrated in FIG. 3, the phase detection unit 3 includes the delay circuit 11, the multiplier (synthesized signal output unit) 12, and the low pass filter (filter processing unit) 13. Each role of the delay circuit 11, the multiplier (synthesized signal output unit) 12, and the low pass filter (the filter processing unit) 13 is the same as described above.

The low pass filter 13 of the phase detection unit 3 outputs the signal after being subjected to the filter processing.

The identification circuit 6 receives the signal from the low pass filter 13 of the phase detection unit 12. The identification circuit 6 identifies a reproduction signal from a detection signal. The identification circuit 6 outputs the reproduction signal.

It is possible to adjust the predetermined value of the detection unit 4. For adjusting the predetermined value, it should be determined whether the BER is focused on or reproducing speed is focused on, in accordance with applications of HDD.

Figure 7:
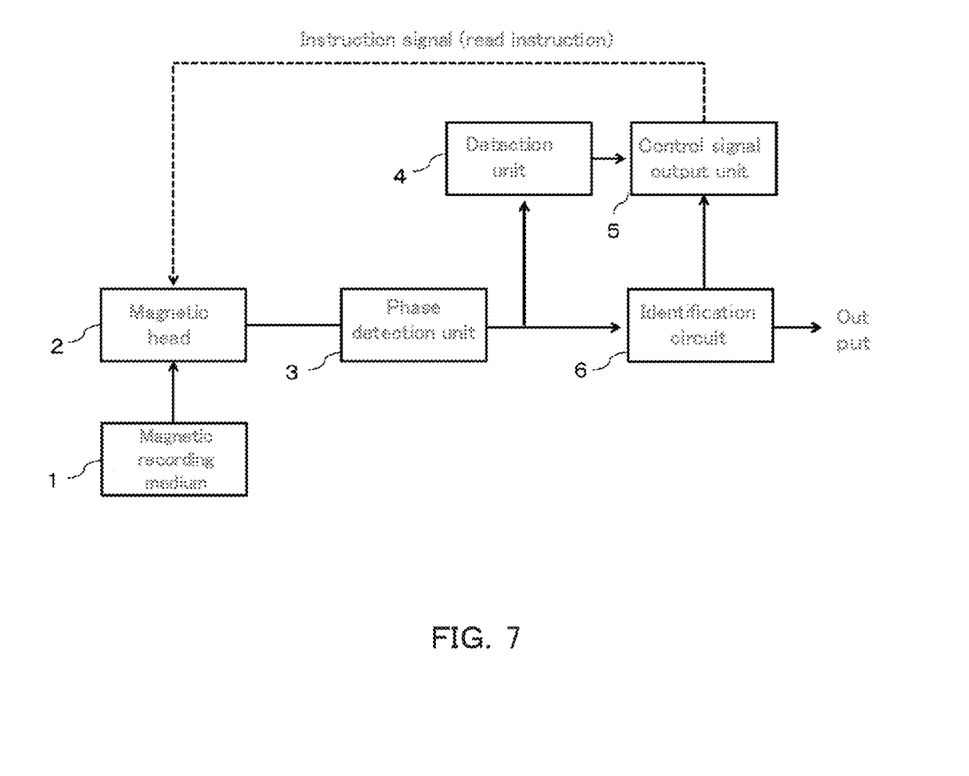
FIG. 7 is a diagram illustrating a configuration of a magnetic recording and reproducing apparatus according to another embodiment.

FIG. 7 illustrates a configuration of a magnetic recording and reproducing apparatus according to a fourth embodiment.

As illustrated in FIG. 7, the detection unit 4 and the identification circuit 6 receives the signal output from the phase detection unit 3.

In FIG. 6, the first signal output from the magnetic head 2 is divided into a part input to the detection unit 4 and a part input to the phase detection unit 3. Thus, the amplitude of the first signal input to the phase detection unit 3 decreases. Thus, as illustrated in FIG. 7, the detection unit 4 and the identification circuit 6 receive the signal output directly from the phase detection unit 3, so the amplitude of the first signal is not deteriorated.

In the embodiment, the magnetic head using the spin torque oscillator is incorporated by a record and reproduction integrated type assembly and such head is mounted on a magnetic recording and reproducing apparatus, for example.

The magnetic recording and reproducing apparatus according to the embodiment may be reproduction use only or both uses of record and reproduction.

Figure 8:
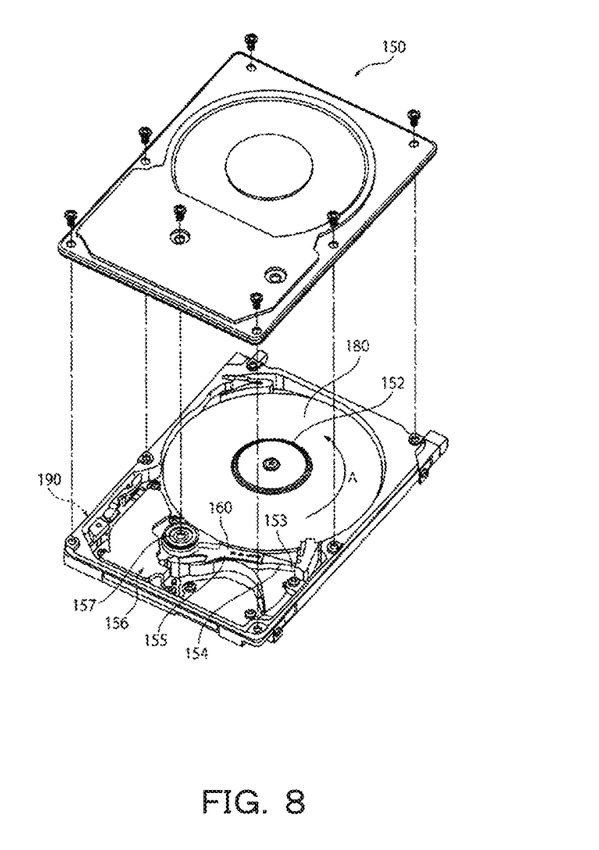
FIG. 8 is a diagram of a configuration of a magnetic recording and reproducing apparatus according to a second embodiment.

FIG. 8 is a schematic perspective view illustrating a configuration of a magnetic recording and reproducing apparatus.

As illustrated in FIG. 8, a magnetic recording and reproducing apparatus 150 is an apparatus in a type of using a rotary actuator. In FIG. 8, a magnetic recording medium (recording medium disk 180) is mounted to a spindle motor 152 and rotates in a direction of an arrow A by the spindle motor 152 in response to a control signal from a control unit of a drive device (not illustrated). The magnetic recording and reproducing apparatus 150 may include a plurality of the recording medium disks 180.

A head slider 153 which performs recording and reproducing of information to be recorded in the recording medium disk 180 is attached to a distal end of a suspension 154 having a thin film shape. Here, the head slider 153 includes the magnetic head according to any of the above-described embodiments along with a magnetic shield which are mounted to the vicinity of the distal end thereof.

That is, the magnetic head includes the spin torque oscillator 10, and the spin torque oscillator is used as the magnetic sensor in this embodiment. When the recording medium disk 180 rotates, a medium opposing surface (ABS) of the head slider 153 is held with a predetermined flying height from a surface of the recording medium disk 180. Incidentally, the head slider 153 may be of a so-called "contact-traveling type", in which the head slider 153 is in contact with the recording and reproducing medium disk 180.

The suspension 154 is connected to one end of an actuator arm 155 including a bobbin for holding a driving coil or the like (not illustrated). A voice coil motor 156, which is a kind of linear motor, is provided on the other end of the actuator arm 155. The voice coil motor 156 can be configured of the driving coil (not illustrated) which is wound up around the bobbin of the actuator arm 155, and a magnetic circuit which includes a permanent magnet and an opposed yoke that area arranged to oppose each other with the coil sandwiched therebetween.

The actuator arm 155 is held by ball bearings (not illustrated) provided at two positions, top and bottom, of a bearing section 157 so as to be slidably rotated by the voice coil motor 156.

Figure 9:
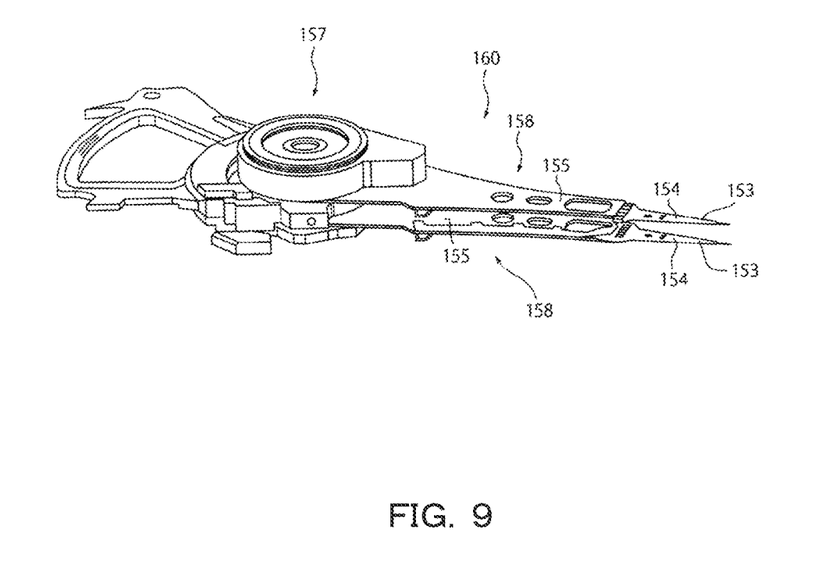
FIG. 9 is a diagram illustrating a part of the configuration of the magnetic recording and reproducing apparatus according to the second embodiment.

FIG. 9 illustrates a part of the configuration of the magnetic recording and reproducing apparatus and is an enlarged perspective view when a magnetic head assembly 160 before the actuator arm 155 is viewed from a disk side.

As illustrated in FIG. 9, the magnetic head assembly 160 includes the bearing section 157, a head gimbal assembly (hereinafter, referred to as the HGA) 158 extending from the bearing section 157, and a support frame which extends from the bearing section 157 in the opposite direction to the HGA and supports the coil the voice coil motor.

The HGA includes the actuator arm 155 extending from the bearing section 157 and the suspension 154 extending from the actuator arm 155. The head slider 153 provided with the magnetic head, which has been already described, is attached to the distal end of the suspension 154.

That is, the magnetic head assembly 160 includes the magnetic head, the suspension 154 having the magnetic head mounted at one end thereof, and the actuator arm 155 connected to the other end of the suspension 154.

The suspension 154 includes a lead wire (not illustrated) for writing and reading of a signal, and this lead wire and each electrode of a magnetic recording head incorporated in the head slider 153 are electrically connected to each other. In addition, electrode pads (not illustrated) are provided in the magnetic head assembly 160. The number of the provided electrode pads is six.

That is, provided are two electrode pads for a coil of the main magnetic pole, two electrode pads for a magnetic reproducing element (that is, the spin torque oscillator 10), and two electrode pads for DFH (dynamic flying height).

A signal processing unit 190 which performs writing and reading of signals with respect to the magnetic recording medium using the magnetic recording head, is provided on a back side of the magnetic recording and reproducing apparatus 150 illustrated in the FIG. 8.

Input and output lines of the signal processing unit 190 are connected to the electrode pads and electrically coupled with the magnetic recording head. Further, the identification circuit 6 is also provided on the back side of the magnetic recording and reproducing apparatus 150 illustrated in the FIG. 8. However, the signal processing unit 150 and/or the identification circuit 6 may be provided externally, not provided on the magnetic recording and reproducing apparatus 150.

In this manner, the magnetic recording and reproducing apparatus 150 includes the magnetic recording medium, the magnetic head, a movable section which is capable of relatively moving the magnetic recording medium and the magnetic head while the magnetic recording medium and the magnetic head are opposed to each other in a spaced or contact state, the control signal output unit 5 which causes the magnetic head to be positioned at a predetermined recording position of the magnetic recording medium, and the signal processing unit which performs the read of the signal with respect to the magnetic recording medium using the magnetic head.

That is, the recording medium disk 180 is used as the above described magnetic recording medium. The above-described movable section can include the head slider 153. In addition, the above described control signal output unit 5 can include the magnetic head assembly 160.

When the magnetic disk 180 is rotated and the head slider 153 is loaded on the magnetic disk 180 by rotating the actuator arm 155 by the voice coil motor 156, the medium opposing surface (ABS) of the head slider 153 mounted to the magnetic head is held with the predetermined flying height from the surface of the magnetic disk 180. In this state, it is possible to read the information recorded in the magnetic disk 180 based on the above-described principle.

Although several embodiments of the invention have been described, these embodiments are provided as examples, and are not intended to limit the scope of the invention. The embodiments can be implemented in a variety of other forms, and various omissions, substitutions and changes thereof may be made without departing from a gist of the invention. The inventions described in the accompanying claims and their equivalents are intended to cover the embodiments or modifications thereof as would fall within the scope and gist of the invention.

What is claimed is:

1. A magnetic recording and reproducing apparatus for recording and reproducing bit information, comprising:
    a magnetic head having a spin torque oscillator, the spin torque oscillator configured to read out bit information which is recorded on a magnetic recording medium and output a first signal which is to reproduce the bit information;
    a detector configured to detect amplitude of the first signal by the spin torque oscillator; and
    a controller configured to control the magnetic head so as to read the bit information recorded on the magnetic recording medium when the amplitude of the first signal detected by the detector is smaller than a predetermined value.

2. The apparatus according to claim 1, wherein the controller configured to control the reading after the detection.

3. The apparatus according to claim 1, wherein the detector configured to output a second signal to the controller when the amplitude of the first signal is smaller than the predetermined value.

4. The apparatus according to claim 1, further comprising a synthesized signal output unit configured to output a signal including a synthesized signal in which the first signal and a third signal which is delayed from the first signal by a predetermined time are synthesized.

5. The apparatus according to claim 4, further comprising a filter processing unit having a predetermined filter configured to receive the output synthesized signal and output a signal including a signal after processed by the filter.

6. The apparatus according to claim 1, wherein the magnetic recording medium is included in the magnetic recording and reproducing apparatus.

7. A magnetic recording and reproducing apparatus for recording and reproducing bit information, comprising:
    a magnetic head having a spin torque oscillator configured to read out bit information which is recorded on a magnetic recording medium;
    a detector, configured to detect amplitude of a first signal which is to reproduce the bit information and configured to output a second signal to the controller when the amplitude of the first signal is smaller than a predetermined value;

a controller configured to control the magnetic head so as to read the bit information recorded on the magnetic recording medium in response to the second signal; and a synthesized signal output unit configured to output a signal including a synthesized signal in which the first signal and a third signal which is delayed from the first signal by a predetermined time is synthesized.

8. The apparatus according to claim 7, wherein the controller configured to control the reading after the detection.

9. The apparatus according to claim 7, further comprising a filter processing unit having a predetermined filter configured to receive the output synthesized signal and output a signal including a signal after processed by the filter.

10. The apparatus according to claim 7, wherein the magnetic recording medium is included in the magnetic recording and reproducing apparatus.

11. The apparatus according to claim 7, when oscillation power relaxation rate $\Gamma_p$ of the spin torque oscillator is less than 0.15 ns$^{-1}$ and the amplitude of the first signal detected by the detector is smaller than a predetermined value, the detector outputs the second signal to the controller.

12. The apparatus according to claim 7, when oscillation power relaxation rate $\Gamma_p$ of the spin torque oscillator is less than 0.10 ns$^{-1}$ and the amplitude of the first signal detected by the detector is smaller than a predetermined value, the detector outputs the second signal to the controller.

13. The apparatus according to claim 7, the predetermined value is set to a value which is a quarter of an average value of the power of the spin torque oscillator.

14. A method for controlling a magnetic recording and reproducing apparatus, the magnetic recording and reproducing apparatus including a magnetic head having a spin torque oscillator, a detector, a controller, and a synthesized signal output unit, the method comprising:

reading out bit information which is recorded on a magnetic recording medium by the magnetic head;

detecting amplitude of a first signal which is to reproduce the bit information;

outputting a second signal to the controller when the amplitude of the first signal is smaller than a predetermined value;

controlling the magnetic head so as to read the bit information recorded on the magnetic recording medium in response to the second signal; and outputting a signal including a synthesized signal in which the first signal and a third signal which is delayed from the first signal by a predetermined time are synthesized.

15. The apparatus according to claim 14, wherein the controller configured to control the reading after the detection.

16. The method of claim 14, the apparatus including a filter processing unit having a predetermined filter, the method further comprising receiving the output synthesized signal and output a signal including a signal after processed by the filter.

17. The method of claim 14, the method further comprising recording bit information on the magnetic recording medium.

* * * * *